Patented Aug. 18, 1931

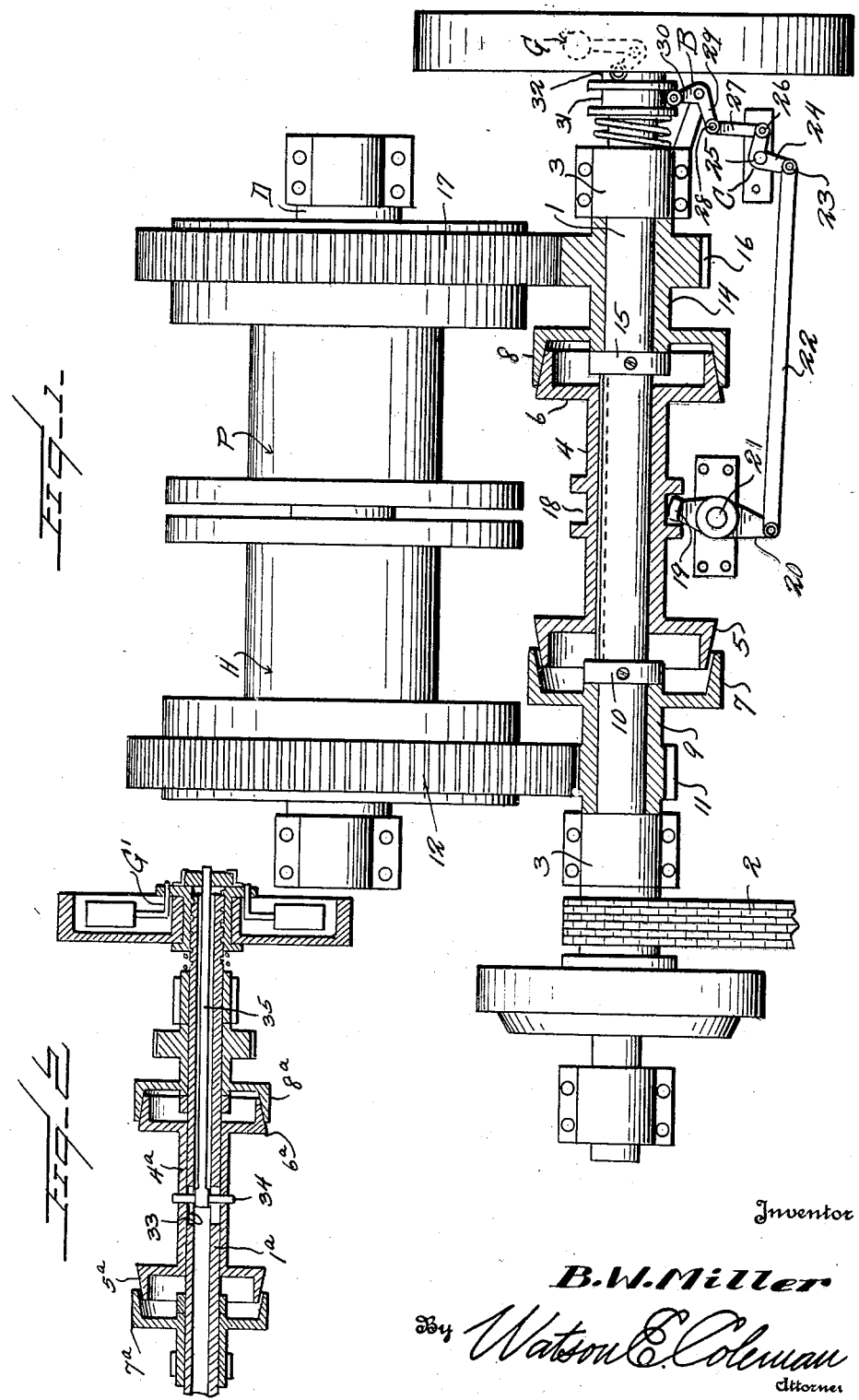

1,819,566

UNITED STATES PATENT OFFICE

BYRON W. MILLER, OF DENVER, COLORADO

POWER TRANSMISSION MECHANISM

Application filed May 16, 1929. Serial No. 363,539.

This invention relates to a power transmission mechanism and it is an object of the invention to provide a mechanism of this kind wherein the operation of the mechanism is automatically controlled in accordance with the speed thereof and which may be used with conventional power shovel and hoisting mechanism.

Another object of the invention is to provide a mechanism of this kind comprising a high gear assembly and a low gear assembly together with means operating automatically to render one of said assemblies operative and the other inoperative in accordance with the speed.

A further object of the invention is to provide a mechanism of this kind including a high gear assembly and a low gear assembly together with means operable under centrifugence to cause one of said assemblies to be operative when the other is inoperative.

The invention consists in the details of construction and in the combination and arrangement of the several parts of my improved power transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in top plan and partly in section and of somewhat a diagrammatic character illustrating a power transmission mechanism constructed in accordance with an embodiment of my invention;

Figure 2 is a fragmentary view partly in section and partly in elevation illustrating a further embodiment of my invention.

As disclosed in the accompanying drawings, 1 denotes a suitably supported shaft driven, as at 2, from any desired source of power. Keyed upon the shaft 1 substantially midway of its bearings 3 for rotation therewith and capable of movement lengthwise thereof is an elongated sleeve 4 provided at its extremities with the clutch members 5 and 6 each herein disclosed of a friction cone type. The friction members 5 and 6 coact respectively with the friction clutching members 7 and 8.

The clutching member 7 is carried by a sleeve 9 freely mounted upon the shaft 1 between a bearing 3 and a thrust collar 10 fixed to the shaft 1. This sleeve 9 carries a pinion 11 meshing with a gear 12. This gear 12 in the present embodiment of the invention constitutes a part of a hoisting drum H of a conventional type employed in connection with power shovel and hoisting machines. The sleeve 9 and the parts concomitant therewith constitute the low gear assembly.

The clutching member 8 is carried by a sleeve 14 freely mounted on the shaft 1 between the second bearing 3 and a thrust collar 15 fixed to the shaft 1. This sleeve 14 carries a gear 16 meshing with a gear 17. In the present embodiment of my invention this gear 17 is comprised in the structure of a pull back drum P of a power shovel or hoisting machine.

The sleeve 14 and its concomitant parts constitute the high gear assembly. It is to be understood, however, that the gears 12 and 17 are common to the driven shaft D, the desired rotation of the drums H and P being under control of the clutches of the type well known in connection with power shovel and hoisting machines and for which reason a detailed description and illustration thereof is believed unnecessary.

Substantially midway its ends the sleeve 4 is provided circumferentially therearound with the groove or channel 18 in which is operatively engaged a shifting arm 19 carried by an end portion of a lever 20. This lever 20 at a desired point intermediate its ends is supported, as at 21, for swinging movement. The end portion of this lever 20 remote from the arm 19 has operatively engaged therewith an end portion of a rod 22. The opposite end portion of this rod 22 is operatively connected, as at 23, with an arm 24 of a bell crank lever C. This lever C has its heel portion supported, as at 25, for rocking movement. The second arm 26 of the lever C has pivotally connected therewith an end portion of a rigid link 27. The opposite end portion of this link 27 is operatively engaged, as at 28, with an arm 29 of a second bell crank lever B. The second arm 30 of this lever B is engaged within the groove or channel 31 disposed circumferentially around the sleeve 32. This sleeve 32 is adapted to have endwise movement along the shaft 1 and is circumferentially operated through the instrumentality of a conventional governor mechanism G.

As the particular construction of the governor mechanism forms no part of the present invention it is not believed necessary that a detailed description and illustration thereof be given other than to say that upon reduction of the speed of the shaft 1 the sleeve 32 will be caused to move outwardly resulting in a declutching of the members 6 and 8 and clutching engagement between the members 5 and 7 whereby the driven shaft D will be caused to run at low speed. As the speed of the shaft 1 picks up the action of the governor results in the desired endwise movement of the sleeve 4 to declutch the members 5 and 7 and to bring the members 6 and 8 into clutching engagement.

As illustrated in Figure 2, the shaft 1a is tubular and provided in its wall with diametrically opposed slots 33 through which extend the end portions of a pin 34. The extremities of the pin 34 are also directed through and in fixed connection with the sleeve 4a. Extending within the shaft 1a through an end thereof is an elongated rod 35. The inner or inserted end of this rod 35 carries the pin 34 while the opposite or outer end portion thereof is operatively engaged with a governor mechanism G' which, upon the variation of load, effects endwise movement of the rod 35 to cause the clutch members 5a and 6a to have desired coaction with the clutching members 7a and 8a respectively.

While I have particularly referred to my power transmission mechanism for use in connection with a power shovel and hoisting machine, it is to be understood that it can be employed with equal advantage for other purposes, as for example, in connection with pumps, automobiles and other power driven mechanisms.

From the foregoing description it is thought to be obvious that a power transmission mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a power transmission mechanism including a drive shaft, a driven member, and a series of gears connecting said drive shaft with said driven member, certain of said gears being rotatably disposed on said drive shaft, clutch elements rotatable with said certain gears, a sleeve rotatable with said drive shaft and having lengthwise movement thereon, opposed clutch elements carried by said sleeve, centrifugal means rotatable with said drive shaft, and sleeve operating means engaging said sleeve and said centrifugal means.

2. In a power transmission mechanism including a drive shaft, a driven member, and a series of gears connecting said drive shaft with said driven member, certain of said gears being rotatably disposed on said drive shaft, clutch elements rotatable with said certain gears, a sleeve rotatable with said drive shaft and having lengthwise movement thereon, opposed clutch elements carried by said sleeve, centrifugal means rotatable with said drive shaft, sleeve operating means engaging said sleeve and said centrifugal means, and a spring for urging said sleeve operating means in one direction whereby to constantly couple selected clutch elements with each other.

In testimony whereof I hereunto affix my signature.

BYRON W. MILLER.